(12) United States Patent
Wang et al.

(10) Patent No.: US 6,954,445 B1
(45) Date of Patent: Oct. 11, 2005

(54) METHOD FOR TRANSMITTING CDMA SHORT DATA BURSTS

(75) Inventors: Chung-Ching Michael Wang, Plano, TX (US); Kim Chang, Richardson, TX (US); Geng Wu, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 743 days.

(21) Appl. No.: 09/655,736

(22) Filed: Sep. 6, 2000

Related U.S. Application Data

(60) Provisional application No. 60/185,330, filed on Feb. 28, 2000.

(51) Int. Cl.[7] ............................................. H04B 7/216
(52) U.S. Cl. ..................................... 370/335; 370/342
(58) Field of Search ................................ 370/310, 328, 370/329, 335, 342, 389, 465, 470, 471

(56) References Cited

U.S. PATENT DOCUMENTS

| | | | |
|---|---|---|---|
| 5,771,017 A | | 6/1998 | Dean et al. |
| 5,887,252 A | * | 3/1999 | Noneman ................... 455/463 |
| 5,963,548 A | * | 10/1999 | Virtanen ..................... 370/335 |
| 6,208,634 B1 | * | 3/2001 | Boulos et al. ............... 370/342 |
| 6,223,028 B1 | * | 4/2001 | Chang et al. ............... 455/419 |
| 6,363,242 B1 | * | 3/2002 | Brown et al. ................. 455/70 |
| 6,614,772 B1 | * | 9/2003 | Sexton et al. ............... 370/335 |

OTHER PUBLICATIONS

"Data Service Options for Spread Spectrum Systems Addendum 2" TIA/EIA/IS-707-A-2. Dec. 1999. pp. 1-1 to iv and 2-39 to 2-42.*

"Global Positioning System Overview", Peter H. Dana, Dept. of Geography, University of Texas at Austin, www.utexas.edu/depts/grg/gcraft/notes/gps/gps.html, 12 pages.

* cited by examiner

*Primary Examiner*—Ricky Ngo
*Assistant Examiner*—Derrick W Ferris
(74) *Attorney, Agent, or Firm*—John D. Crane; Dillon & Yudell LLP

(57) ABSTRACT

A method for improving the transmission efficiency of a short data burst (SDB) in a CDMA telecommunications network by generating an SDB comprising a service reference identifier, a service option omit field indicating whether a service option identifier is to be included or omitted from the SDB, and a data block. The SDB may thus be generated without a service option identifier and, as such, be more efficiently transmitted between a base station and a mobile station, thereby resulting in a typical gain over the prior art of up to 2% of data capacity.

5 Claims, 5 Drawing Sheets

METHOD FOR TRANSMITTING CDMA SHORT DATA BURSTS

CLAIM OF PRIORITY

This application claims priority from U.S. Provisional Patent Application No. 60/185,330 to Wang, et al, entitled "CDMA Short Data Burst without Service Option Information" filed Feb. 28, 2000.

TECHNICAL FIELD

The invention relates generally to wireless telecommunications and, more particularly, to wireless telecommunications using CDMA short data bursts.

BACKGROUND

Short Data Bursts (SDB) is a widely used feature in Code Division Multiple Access (CDMA), including third generation CDMA (3G CDMA, also referred to as cdma2000) base stations and mobile stations. SDBs are designed for, but are not restricted to, exchanging a small amount (typically less than 100 bytes) of "bursty" packet data over dedicated channels and/or common channels between a base station and a mobile station. Dedicated channels include forward and reverse Fundamental Channels (F/R-FCH), and forward and reverse Dedicated Control Channels (F/R-DCCH). Common channels include Paging Channels (PCH), Access Channels (ACH), and forward and reverse Common Control Channels (F/R—CCCH).

A drawback to using SDBs is that, in addition to the actual data to be transmitted, SDBs also require three bytes of overhead, including three bits reserved for a service reference identifier (SR_ID), five bits reserved for future use, and sixteen bits reserved for a Service Option number (SO), which require additional bandwidth when SDBs are transmitted. Because bandwidth is limited, and because it is anticipated that the use of SDBs will increase, a continuing search has been directed toward the development of methods for using SDBs which would minimize the bandwidth required to transmit SDBs, and increase the data capacity of wireless communications.

SUMMARY

The present invention provides for a method of improving the transmission efficiency of a short data burst (SDB) in a CDMA telecommunications network by generating an SDB comprising a service reference identifier, a service option omit field indicating whether a service option identifier is to be included or omitted from the SDB, and a data block. The SDB may thus be generated without a service option identifier and, as such, more efficiently transmitted between a base station and a mobile station, thereby resulting in a typical gain over the prior art of up to 2% of data capacity.

BRIEF DESCRIPTION OF THE DRAWINGS

For a more complete understanding of the present invention, and the advantages thereof, reference is now made to the following descriptions taken in conjunction with the accompanying drawings, in which:

FIG. 7 is a flow chart illustrating control logic for transmitting an SDB in accordance with the present invention after a mobile station has powered on.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning the operation of CDMA and the like have been omitted inasmuch as such details are not necessary to obtain a complete understanding of the present invention and are within the skills of persons of ordinary skill in the relevant art.

Figure 1:
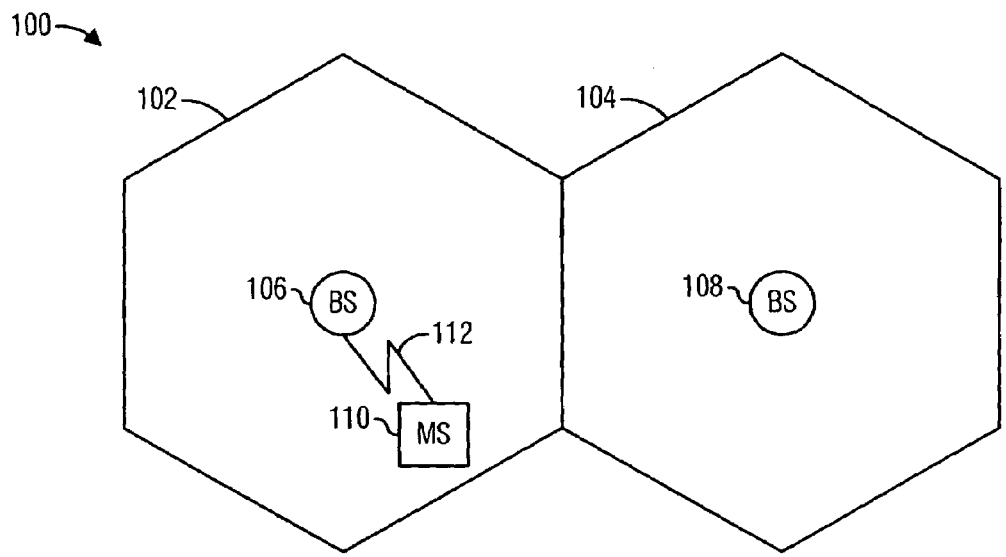
FIG. 1 is a schematic diagram of two cells of a wireless communications system.

Referring to FIG. 1 of the drawings, the reference numeral 100 generally designates a portion of a wireless CDMA telecommunications network which embodies features of the present invention. Specifically, the wireless communications portion 100 includes one or more cells 102 and 104 having respective base stations 106 and 108 configured for transmitting and receiving signals from a mobile station (MS), such as the MS 110 shown in the cell 102. The base stations 106 and 108 and the MS 110 communicate via CDMA technology over an RF interface channel 112. The channel 112 may be either a dedicated channel (e.g., forward and reverse Fundamental Channels, forward and reverse Dedicated Control Channels, and the like) or a common channel (e.g., Paging Channels, Access Channels, forward and reverse Common Control Channels, and the like). Wireless telecommunications via CDMA technology is considered to be well-known in the art and will therefore not be discussed in further detail herein, except insofar as necessary to describe the present invention.

Figure 2:
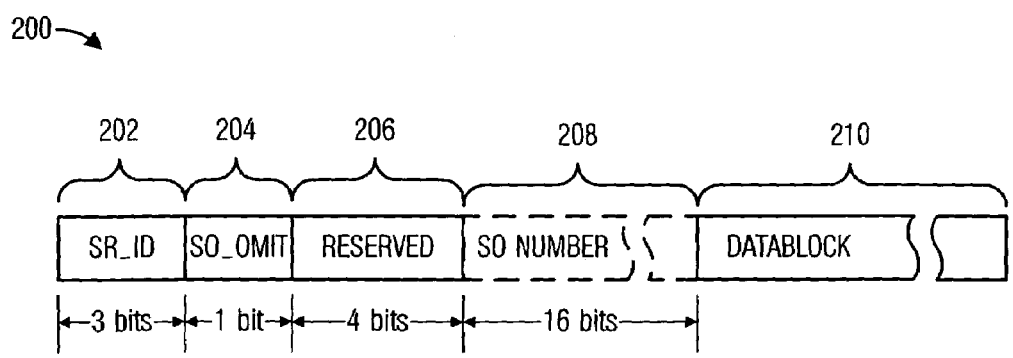
FIG. 2 depicts a format of a Short Data Burst (SDB) embodying features of the present invention.

FIG. 2 depicts the format of a Short Data Burst (SDB) Service Data Unit (SDU) 200 embodying features of the present invention for use in exchanging up to 252 bytes (typically less than 100 bytes) of "bursty" packet data over dedicated channels and/or common channels between a base station and a mobile station.

The SDB SDU 200 comprises a number of fields. Specifically, a Service Reference IDentifier (SR_ID) field 202 comprising three bits is reserved for identifying a service instance, such as voice, packet data, video data, and the like. As discussed further below, a Service Option omit (SO_OMIT) field 204 (not found in the prior art) comprising one bit is reserved for indicating whether an SO field (discussed below) is included or omitted. A reserve field 206 comprises four bits (rather than five bits as called for in the prior art) which are reserved for future use. A Service Option identifier, or number, (SO) field 208, shown in dashed outline and comprising sixteen bits, is optionally allocated, depending on the setting of the bit in the SO_OMIT field 204, for identifying a service option, such as, for example, voice, data, facsimile, or the like, as defined in TIA/EIA/ TSB-58-C. For example, if the SR_ID field 202 is set to voice communication, the SO field 208 may be set to 8 K vocoder, 13 K vocoder, or the like. A datablock 210 carries up to 252 bytes of a data payload for the SDB SDU 200, so that the total number of bytes which constitute the SDB SDU 200 may be up to 256 bytes. The SR_ID 202, reserved bits 206, SO field 208, and datablock 210 are considered to be well-known to one skilled in the art and, therefore, will not be discussed in further detail herein, except insofar as necessary to describe the present invention.

Figure 3:
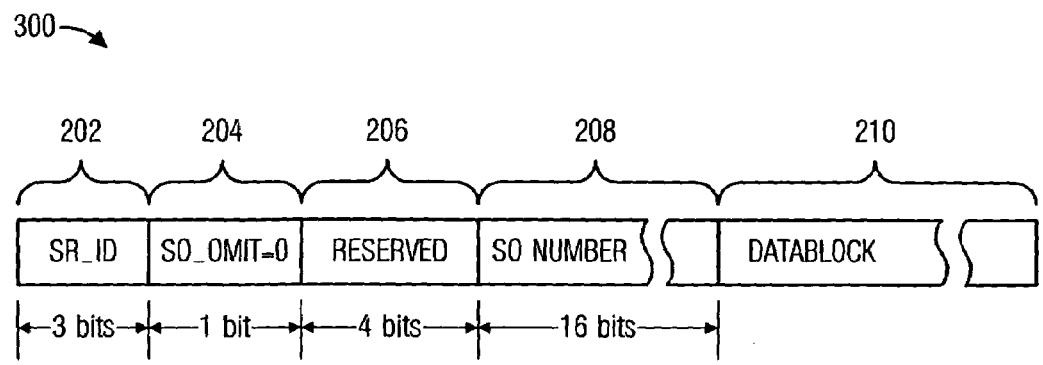
FIG. 3 depicts the SDB of FIG. 2 with a Service Option (SO) field.
Figure 4:
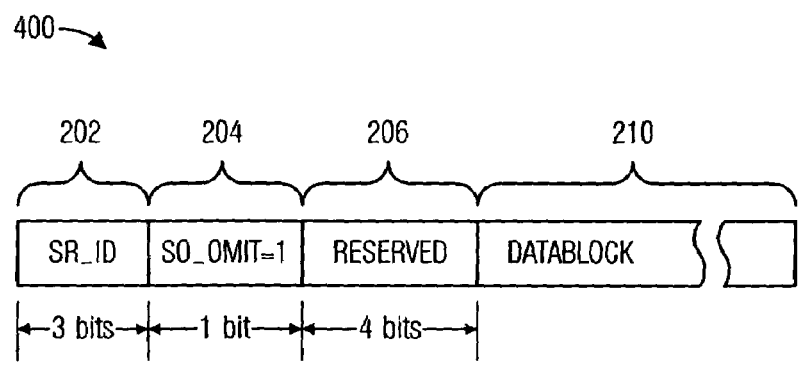
FIG. 4 depicts the SDB of FIG. 2 without an SO field.

As mentioned above, the SO field 208 may be optionally included or omitted, depending on the setting of the bit in the SO_OMIT field 204, which may be set to a "0" or a "1". Preferably, if the bit in the SO_OMIT field 204 is set to "0", then the SO field 208 is included, thereby forming an SDB SDU 300 as depicted in FIG. 3. Alternatively, if the SO_OMIT field 204 is set to "1", then the SO field 208 is omitted to form an SDB SDU 400, thereby forming an SDB SDU 400 as depicted in FIG. 4.

Figure 5:
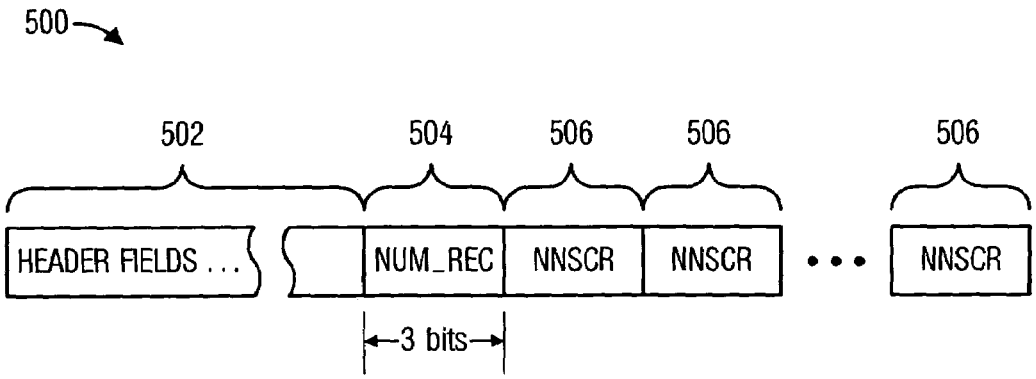
FIG. 5 depicts a Service Connect Message embodying features of the present invention.

FIG. 5 shows the format of a message 500, such as a Service Connect Message, a General Handoff Direction Message, a Universal Handoff Message, or the like, that may be transmitted from the base station 106 or 108 when initiating a channel connection with the MS 110. The message 500 includes a number of header fields 502 (e.g., forward power control) which are considered to be well-known in the art and, therefore, will not be discussed in further detail herein. Still further, the Service Connect Message 500 includes a NUM_REC field 504 which preferably comprises three bits for indicating how many (up to seven, only three of which are shown) Non-Negotiable Service Configuration Records (NNSCR) 506, discussed in further detail below with respect to FIG. 6, are included in the message 500.

Figure 6:
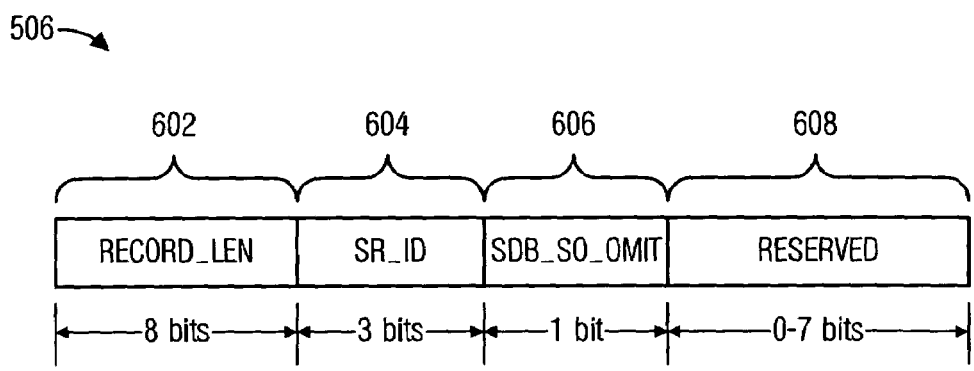
FIG. 6 depicts a Handoff Direction Message embodying features of the present invention.

FIG. 6 shows the format of fields of an NNSCR 506. Included in the NNSCR 506 are a RECORD_LEN field 602, an SR_ID field 604, and SDB_SO_OMIT field 606, a reserved field 608. The RECORD_LEN field 602 comprises eight bits for indicating how long the NNSCR 506 is in octets, including the field 602. The RECORD_LEN field 602 may, for example, consist of "00000010" to indicate that the NNSCR 506 comprises three octets. The SR_ID field 604 comprises three bits for storing a Service Reference Identifier, similar to the SR_ID discussed above with respect to the field 202 of FIGS. 2–4. The SDB_SO_OMIT field 606 comprises one bit which indicates whether the SO field is included or omitted in the SDB SDU 200. As with the SO_OMIT field 204 discussed above, a "0" indicates that the SO field 208 is to be included, as exemplified in the SDB SDU 300 (FIG. 3), and a "1" indicates that the SO field 208 is to be omitted, as exemplified in the SDB SDU 400 (FIG. 4).

Figure 7:
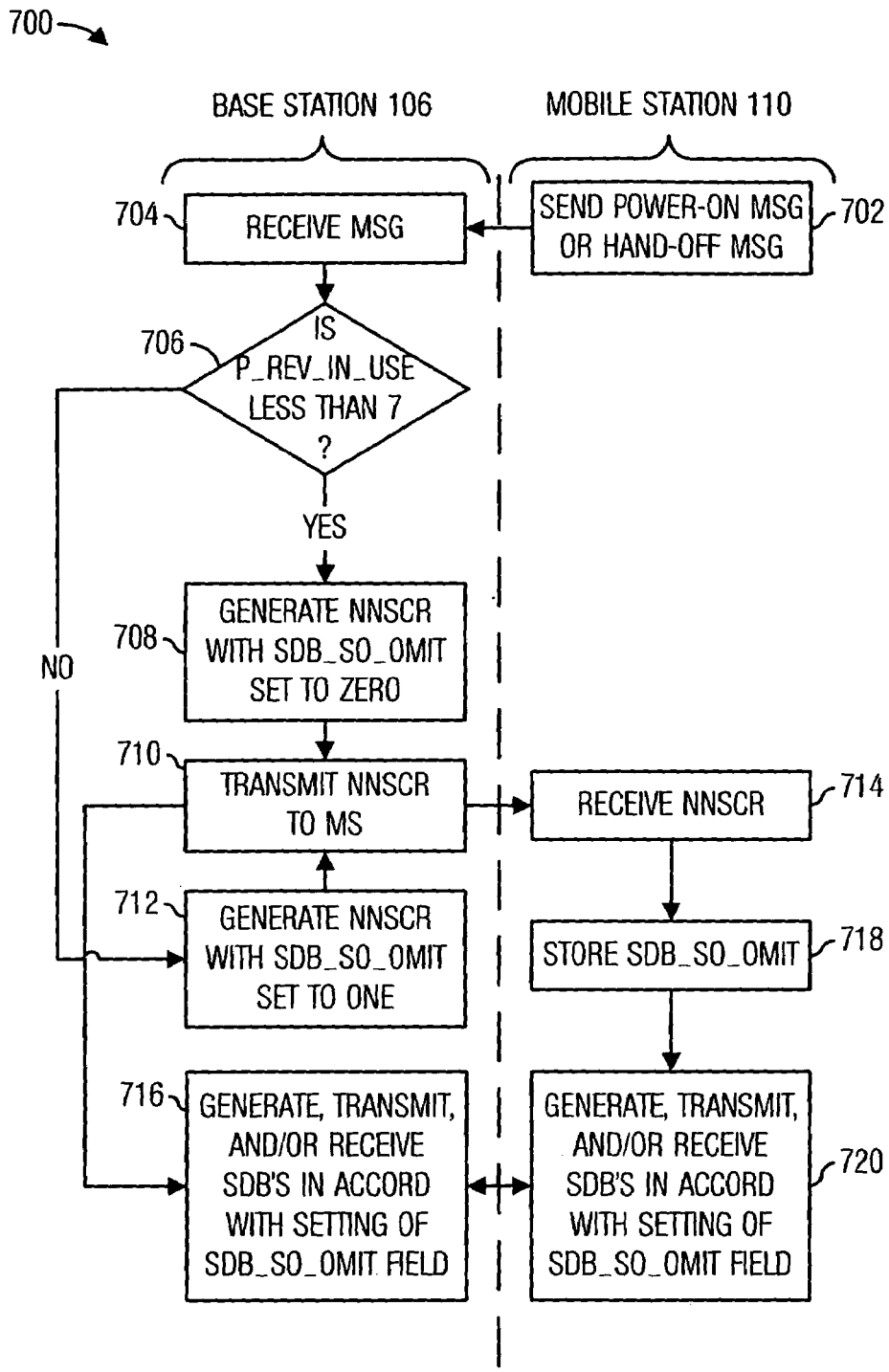

FIG. 7 depicts a flowchart 700 of steps such as may be embodied in code, such as computer program code, executable by a processor (not shown) of the base station (BS) 106 and/or the mobile station (MS) 110 for transmitting an SDB SDU 200 therebetween following power-up by the MS 110. In step 702, the MS 110 powers up and transmits a conventional signal for connecting to, or for negotiating, a service, which signal is received in step 704 by the BS 102. In step 706, the BS 106 makes a determination from the message received in step 704 whether the Protocol Revision in use (P_REV_IN_USE) by the MS 110 is less than seven. If it is determined that the P_REV_IN_USE is less than seven, indicating thereby that the field 208 (FIG. 2) may not be omitted, then execution proceeds to step 708. In step 708, the BS 106 generates an NNSCR, such as the NNSCR 506 (FIG. 6), and sets the SDB_SO_OMIT to zero. In step 710, the BS 106 encapsulates the NNSCR generated in step 708 in a message, such as the message 500 (FIG. 5), and transmits the message.

If in step 706, it is determined that the (P_REV_IN_USE) by the MS 110 is not less than seven, indicating thereby that the SO field 208 (FIG. 2) may be omitted, then execution proceeds to step 712. In step 712, the BS 106 generates an NNSCR, such as the NNSCR 506 (FIG. 6), and sets the SDB_SO_OMIT to one. In step 710, the BS 106 encapsulates the NNSCR generated in step 712 in a message, such as the message 500 (FIG. 5), and transmits the message.

Upon transmission of the encapsulated NNSCR in step 710, execution proceeds to steps 714 and 716. In step 714, the MS 110 receives the NNSCR transmitted by the BS 106 in step 710. In step 718, the BS 106 stores the SDB_SO_OMIT value of either zero or one as a variable SDB_SO_OMIT$_s$[SR_ID] (not shown) per the connected SR_ID. In step 720, as well as step 716, the MS 110 and the BS 106, respectively, generate, transmit, and or receive SDB SDUs 200 over the channel 112 (FIG. 1) in a conventional manner (e.g., in a Data Burst Message whose Burst Type is set to "Short Data Burst"). However, the SO_OMIT field 204 is set according to the SDB_SO_OMIT$_s$[SR_ID] variable, and, if the SO_OMIT field 204 is set to one, then the SDB SDUs are transmitted without an SO field 208, similar to the SDB SDU 400 shown in FIG. 4, thereby saving 16 bits of data.

Figure 8:
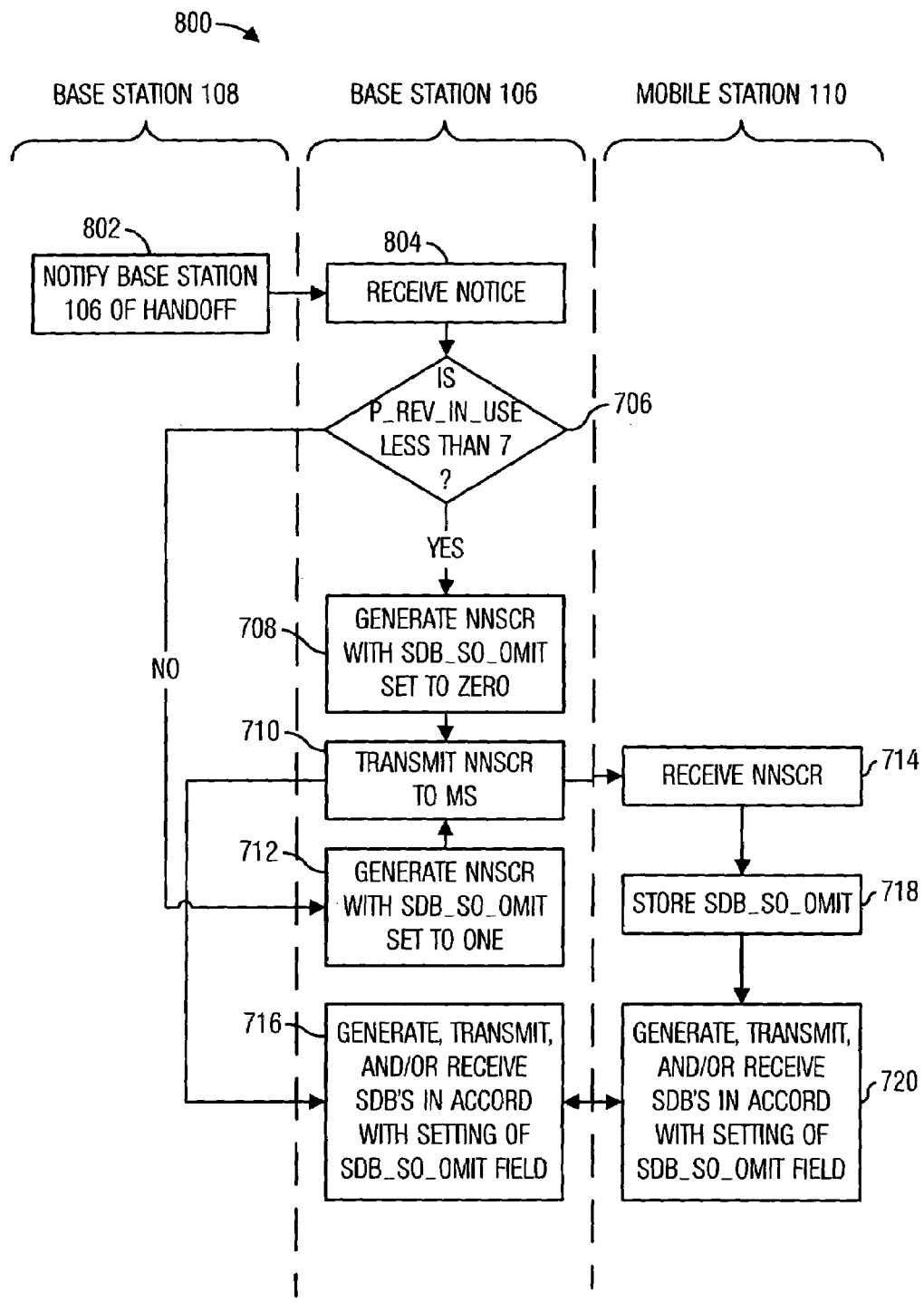
FIG. 8 is a flow chart illustrating control logic for transmitting an SDB in accordance with the present invention after a mobile station has moved between sectors of a cell or between cells of a wireless communications system.

FIG. 8 depicts a flowchart 800 of steps such as may be embodied in code, such as computer program code, executable by a processor (not shown) of the BS 106 and/or the MS 110 for transmitting one or more SDB SDUs 200 therebetween following movement of the MS 106 from the cell 104 to the cell 102 (FIG. 1). In step 802, a conventional handoff, either general or universal, is executed between the cells 104 and 102, and the base station 106 is notified of such handoff in a conventional manner. In step 804, the BS 106 receives the notice of the handoff with the MS 110 entering the cell 102 from the cell 104. Steps 706–720 are substantially similar to those of the like-numbered steps discussed above with respect to FIG. 7.

By the use of the present invention, 16 bits may be eliminated from an SDB SDU 200, thereby utilizing valuable bandwidth more efficiently. For a typical SDB SDU comprising about 100 bytes, the present invention conserves about 2% of the bandwidth required to transmit data.

It is understood that the present invention can take many forms and embodiments. Accordingly, several variations may be made in the foregoing without departing from the spirit or the scope of the invention. For example, variables (e.g., SR_ID, SO_OMIT, SO) may be renamed, the number of bits assigned to variables may vary from the number described herein, and/or required information may be sent over the air in different messages.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for improving the transmission efficiency of a short data burst (SDB) in a CDMA telecommunications network, the method comprising the steps of:
    generating an SDB comprising:
        a service reference identifier;
        a service option identifier;
        a multi-bit reserve field; and
        a data block;
    designating a single bit within said multi-bit reserve field as a service option identifier omit indicator; and
    thereafter transmitting the SDB with or without the service option identifier in response to a state of said designated single bit within said multi-bit reserve field.

2. The method of claim 1 wherein the steps are performed by a base station.

3. The method of claim 1 wherein the steps are performed by a mobile station.

4. A short data burst comprising:
    a service reference identifier;
    a service option identifier:
    a multi-bit reserve field;
    a single bit within said multi-bit reserve field designated as a service option identifier omit indicator;
    a data block.

5. A mobile station comprising:
    a processor:
    code executable by the processor for generating a short data burst (SDB) comprising:
        a service reference identifier;
        a service option identifier;
        a multi-bit reserve field;
        a single bit within said multi-bit reserve field designated as a service option identifier omit indicator; and
        a data block; and
    code executable by the processor for transmitting the SDB with or without the service option identifier in response to a state of said designated single bit within said multi-bit reserve field.

* * * * *